May 3, 1932.  V. D. POPOV  1,856,884
MEANS FOR THE AUTOMATIC WEIGHING OF GOODS OF DIFFERENT KINDS
Filed April 4, 1930  2 Sheets-Sheet 1
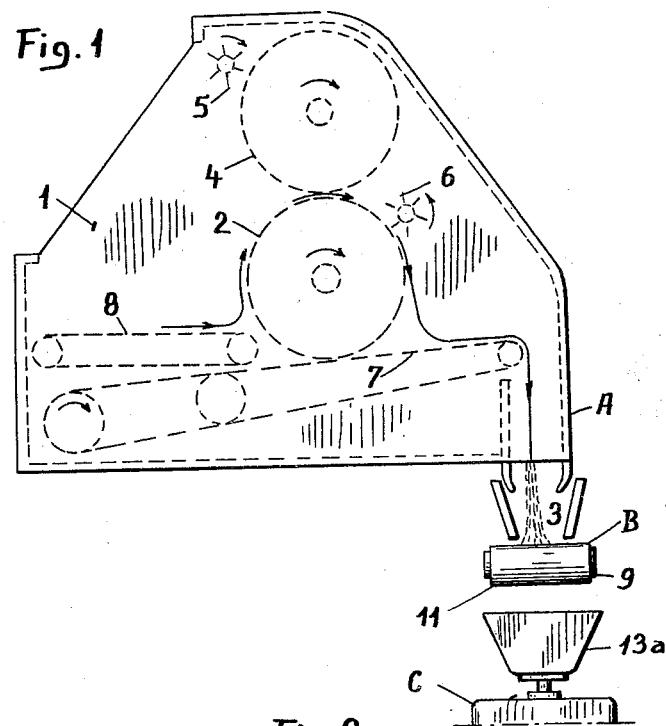
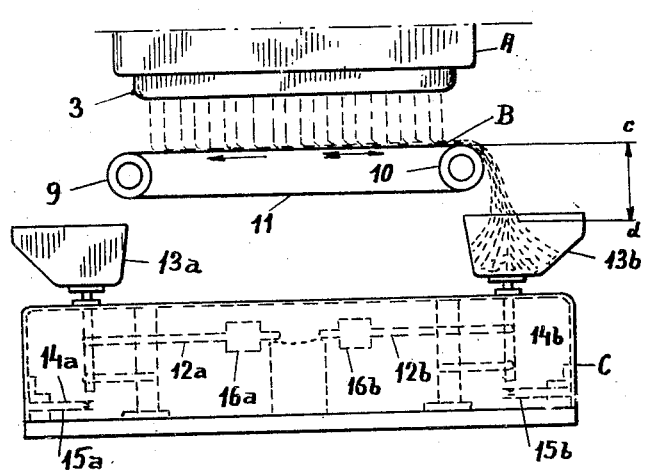
Vladimir Dmitrijević Popov
INVENTOR:
By (signature)
his Attorney.

May 3, 1932. V. D. POPOV 1,856,884
MEANS FOR THE AUTOMATIC WEIGHING OF GOODS OF DIFFERENT KINDS
Filed April 4, 1930 2 Sheets-Sheet 2
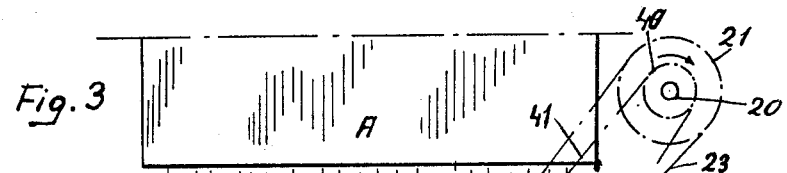
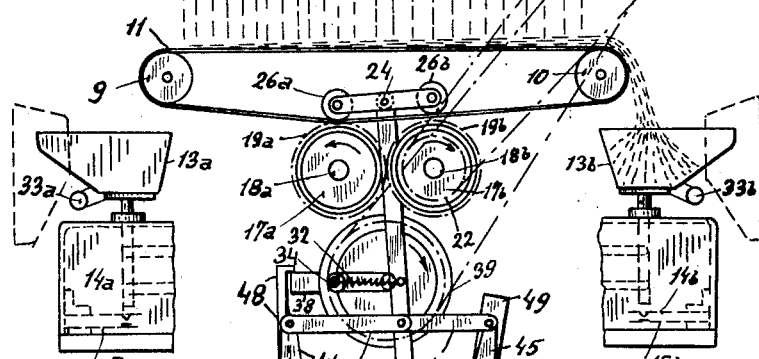
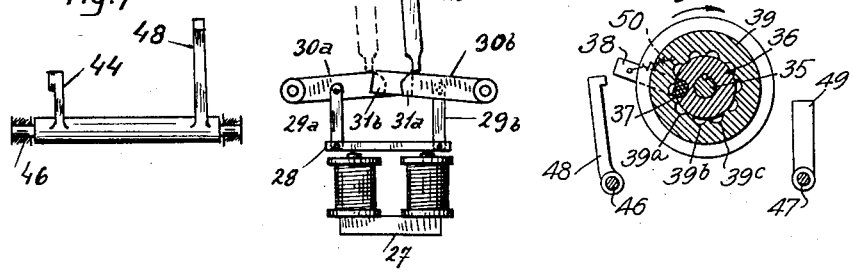
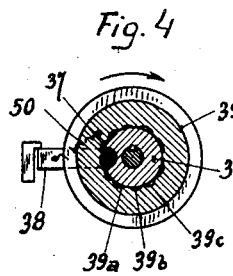
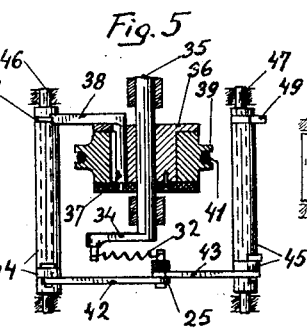
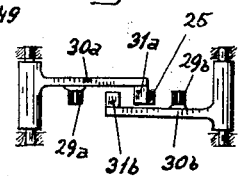
Vladimir Dmitrijevič Popov
INVENTOR Patented May 3, 1932

1,856,884

UNITED STATES PATENT OFFICE

VLADIMIR DMITRIJEVIČ POPOV, OF PILSEN, CZECHOSLOVAKIA

MEANS FOR THE AUTOMATIC WEIGHING OF GOODS OF DIFFERENT KINDS

Application filed April 4, 1930, Serial No. 441,627, and in Czechoslovakia April 5, 1929.

This invention relates to a system of automatic weighing in which the material to be weighed is conveyed from a storage container to the weighing machine proper by means of a continuously travelling endless belt, which is capable of altering periodically the direction of its travel so as to convey the material issuing from the storage container alternately into first one and then the other of the two scales with which the weighing machine is provided. The use of an endless band travelling alternately in two opposed directions enables the disadvantage of the hitherto known devices for the conveyance of material into the scales of weighing machines to be avoided, namely the disadvantage that when goods such as tea, tobacco, or the like are being weighed the channels through which these goods flow on the way to the scales easily become blocked, because of the fibrous nature of the goods concerned.

One form of apparatus embodying the principle of the present invention is shown in the accompanying drawings, in which Figs. 1 and 2 illustrate diagrammatically the feed system to the weighing machine, while Figs. 3, 4, 5, 6, 7 and 8 represent the automatic weighing machine in its entirety.

It is well known in connection with cigarette making machines that if the tobacco be passed between broad spike drums and then scattered in as thin and broad a stream as possible on to a continuously and uniformly travelling belt a layer of tobacco of uniform section is obtained which, when it is cut at exactly equal intervals, produces cigarettes of equal weight with an error limit of ±5%.

The method here employed of conveying material from a reserve supply to an apparatus ensures a uniform flow of the material with a greater degree of probability than is the case with the systems most usually employed for conveying goods to automatic weighing machines. In the apparatus according to the present invention a conveying device incorporating known types of drums is employed in connection with two scale beams, whereby the possibility is provided of weighing up portions with the required degree of accuracy.

Figs. 1 and 2 illustrate diagrammatically the relative positions of the three elements A, B, and C—container, conveyor, and weighing machine—constituting the apparatus according to the invention.

A is a storage and feed device for the uniform delivery of material, for instance of tobacco, and is similar to that normally used in connection with cigarette making machines. The tobacco is caught up by a continuously rotating spiked drum 2 and delivered to the outlet opening 3 (Figs. 1 and 2). For the purpose of ensuring a uniform flow of tobacco from the storage chamber the means usually employed are those indicated in the drawings, i. e. a spike drum 4 which removes superfluous tobacco from the spikes of the drum 2 and ensures a uniform distribution of tobacco over the entire surface of the drum 2, an angular or spike roller 5 which removes any tobacco adhering to the drum 4 and rejects it into the storage chamber 1, and finally a roller 6 provided with needles which detaches the tobacco from the drum 2 and scatters the same on to a continuously travelling belt 7, which delivers the tobacco to the outlet opening 3. A belt 8 (see Fig. 1) disposed in the chamber 1 feeds the material continuously to the roller 2, preventing the latter from running idle.

A similar device can be used for the delivery of other goods, e. g. tea, or the like, from the storage chamber 1, with the sole modification that the pick up drum 2 is provided with a suitable number of longitudinal grooves instead of the spikes employed in connection with the conveyance of tobacco.

The conveyor proper —B— consists of two pulley wheels 9 and 10 and an endless belt 11 (see Figs. 1 and 2).

The weighing machine —C— comprises a case containing two balances 12a and 12b provided with the scales 13a and 13b. The left-hand balance (in Fig. 2) is provided with contact springs 14a and 15a, and the right-hand balance with the contact springs 14b and 15b. The purpose of these springs will be hereinafter described.

Supposing the apparatus A to be set in motion tobacco will be delivered from the opening 3 on to the belt 11, which travels over the pulley wheels 9 and 10 in the direction of the barbed arrow in Fig. 2 and the tobacco will be thus conveyed into the right-hand scale 13$b$. The filling of this scale 13$b$ eventually reaches a point at which the weight 16$b$ is lifted and the beam 12$b$ tilted. The tilting of this beam brings the two springs 14$b$ and 15$b$ into contact with each other, and the making of this contact can then be employed to actuate any suitable form of device (not shown in Fig. 2), e. g. an electromagnetic switch, capable of causing the direction of travel of the belt 11 to be reversed, as indicated by the plain arrow in Fig. 2. The stream of tobacco or other goods which issues uninterruptedly from the apparatus A on to the belt 11 proceeds now to fill the scale 13$a$ in a similar manner. During the filling of this latter (left-hand) scale the right-hand scale 13$b$ must be emptied, either by hand or by any known form of automatic means, and then returned to its original position on the scale beam 12$b$.

After the filling of the scale 13$a$ the beam 12$a$ is tilted and thus makes contact between the springs 14$a$ and 15$a$, the belt 11 reverses its direction of travel and proceeds to convey the goods to the right-hand scale 13$b$ again, and the scale 13$a$ can then be emptied.

A point requiring consideration at this juncture is that the effect of the contact between the springs 14$a$ and 15$a$ or 14$b$ and 15$b$ occurs at the moment the scale pan concerned has actually become filled with a quantity of matter of a certain definite weight. After contact has been established a certain additional quantity of matter, namely the quantity contained in the column $c$—$d$ at the moment of contact, will drop into the scale just filled (see Fig. 2). It has been mentioned above that the described delivery appliance is capable of delivering the goods to be weighed in a stream of such uniformity that equal portions or sections of this stream are of equal weight within an error limit of $\pm 5\%$. The amount represented by the column $c$—$d$ will thus always contain a quantity of the same weight, all other factors remaining unchanged, and that with a limit of error of $\pm 5\%$.

The error in weight due to the after-flow of the amount contained in the column $c$—$d$ can thus be accurately allowed for, and the claim of accuracy for the weighing in accordance with the described process thus holds good, it being merely necessary to determine the speed of the delivery of the goods according to the size of the portions required, the absolute weight of the amount in the column $c$—$d$ being determined in advance and reckoned in with the total weight of the portion required.

The described method of weighing is thus carried out with the help of two weighing machines, which alternately receive the goods to be weighed from a belt 11, which is itself uninterruptedly supplied from a delivery device A. The uninterrupted feed increases the working capacity of the apparatus and simplifies the construction of the same as compared with other known types of apparatus for the same purpose, which latter, as mentioned above, are under the disadvantage of having to be brought to a standstill at the conclusion of each separate weighing operation.

The constructive details of a complete apparatus according to the present invention are illustrated more or less diagrammatically in Figs. 3 to 8.

The materials to be weighed out in portions are delivered by the apparatus A on to an endless belt 11, which is capable of being driven in either of two opposed directions by one of the two continuously and oppositely rotating drums 17$a$ and 17$b$, which are mounted on two shafts 18$a$ and 18$b$ connected together by means of the pinions 19$a$ and 19$b$. These drums may be driven from a main driving shaft 20 by means of pulley wheels 21 and 22 and a belt 23.

A lever or pendulum 25 is mounted on a stud shaft 24 in such a manner as to be capable of oscillating, and is provided at its upper end with a cross piece forming two arms on which rollers 26$a$ and 26$b$ are mounted. The pendulum 25 is designed to press the belt 11, by means of the rollers 26$a$ and 26$b$, against one or other of the pulley wheels 17$a$ and 17$b$, and thus to cause the belt 11 to travel in one or the other of two opposed directions. The pulley wheels 17$a$ and 17$b$ may be covered with an elastic material, e. g. rubber, for the purpose of ensuring adequate friction between the belt 11 and the pulley wheels 17$a$ and 17$b$.

In Fig. 3 the pendulum 25 is shown in a position in which it presses the belt 11 by means of the roller 26$a$ against the pulley wheel 17$a$, so that the goods are conveyed into the scale pan 13$b$.

After the scale pan 13$b$ has received the required portion of the goods to be weighed contact is made, as already described, between the spring contacts 14$b$ and 15$b$, with the result that an electro-magnet 27 is excited and draws the pendulum, by means of the co-operation of an armature 28 with two connecting rods 29$a$ and 29$b$ and the levers 30$a$ and 30$b$, out of engagement with a keeper or latch member 31$a$ on the lever 30$a$, so that the said pendulum is free to respond to the tension of the spring 32 and instantaneously swings across and assumes the position shown in dotted lines in Fig. 3. The belt 11 ceases in the same instant to derive its movement from the pulley wheel 17$a$ and simultaneously has imparted thereto a movement in the opposite direction by being pressed by the roller 26b against the pulley wheel 17b.

As soon as the filling of the scale pan 13b is concluded the weighed portion must be removed therefrom for the purpose, on the one hand of interrupting the contact between the springs 14b and 15b, and on the other hand of preparing the scale pan 13b for the reception of the next portion.

The emptying of the scale pans may be effected in any known manner (not shown in detail in the drawings), for instance by automatic tilting about an axis 33b, as indicated in Fig. 3.

The spring 32 is attached at one end to the pendulum lever 25 and at the other end to a crank lever 34 secured to a suitably mounted shaft 35, which also carries a jointed coupling, which is capable, under certain definite circumstances, of rotating the shaft 35 through 180°. This coupling or clutch consists of the following parts (see Figs. 4 and 5):—A cylindrical body 36, a link or engaging pin 37 with a latch 38, and a hollow cylindrical body 39 fitting over the cylindrical body 36, which hollow cylindrical body is formed externally as a pulley and is provided internally with a continuous series of grooves 39a, 39b, 39c, etc. of semi-circular section and disposed parallel to the axis of the said hollow cylindrical body (see Fig. 4). This hollow cylinder 39 is continuously rotated by the main driving shaft 20 through the agency of a pulley 40 and a belt or cord 41. The pendulum lever 25 is connected by means of rods 42 and 43 to cranked levers 44 and 45 (see Fig. 7), which are adapted to oscillate about shafts 46 and 47, which are mounted in suitable bearings.

The purpose of the levers 44 and 45 is to control the jointed coupling or clutch by means of a hook 48 on the end of the lever 44 and a stop 49 on the end of the lever 45. As long as the pendulum lever 25 is in engagement with the keeper 31a of the lever 30a the rod 42 holds the link or engaging pin 37, through the agency of the lever 44, the hook 48, and the latch 38, in a position which precludes the possibility of the engagement of the same with the hollow cylinder 39. As soon, however, as the pendulum lever 25 is released by the keeper 31a of the lever 30a (as a result of the excitation of the electromagnet 27) and has been brought by the action of the spring 32 into the position shown in dotted lines in Fig. 3 the hook 48 also comes out of engagement with the latch 38, with the result that the link 37 is actuated by the spring 50, engages in one of the grooves on the hollow cylinder 39 (Fig. 8), and thus causes the shaft 35 to be rotated. The rotation of the shaft 35 is however limited to 180° in extent, since the latch 38 comes up against the stop 49 on the lever 45, whereby the link 37 is simultaneously brought out of engagement with the hollow cylinder 39. Simultaneously with the rotation of the shaft 35 through half a revolution the crank 34 is rotated into a position opposed to that which it has hitherto occupied, so that the spring 32 is also reversed in position in regard to the pendulum lever 25 and is set to draw the latter from left to right, instead of from right to left as indicated in Fig. 3, at the end of the current filling phase.

When therefore the scale pan 13a has in its turn been filled and has actuated the electro-magnet in the described manner, through the agency of the contacts 14a and 15a the pendulum lever 25 is caused by the action of the spring 32 to reassume the position shown in full lines in Fig. 3, in which position the belt 11 conveys the goods once more into the scale pan 13b. The complete cycle as described is then repeated.

The link 37 rigidly connected with the latch 38 is of such form that when the latch is in the position shown in Fig. 4 the link is completely depressed in the groove of the cylindrical body 36 so that no part of the link 37 projects beyond the periphery of the body 36. Secured to the latch 38 is one end of a spring 50 the other end of which is secured to the rear enlarged part of the body 36 (Fig. 5), whereby the spring will participate in the movement of the body 36. By reason of the spring 50, the latch 38 and link 37 will occupy the positions in relation to the cylindrical body 36 as shown in Fig. 8, provided that the outer end of the latch is not turned by any obstruction into the position shown in Fig. 4. In the position of Fig. 8, a part of the latch 38 projects beyond the periphery of the cylindrical body 36 into one of the grooves 39a, 39b, etc., of the follow cylindrical body 39, and in this position of the parts the continuously driven body 39 will carry along with it the body 36 as these members are coupled together for rotation by the link 37.

The size of the weighed portions in the scale pans 13a and 13b depends upon the size of the weights 16a and 16b (see Fig. 2). It is therefore possible with the described apparatus, by the suitable proportioning of the weights 16a and 16b, to weigh a different quantity in each of the two scale pans.

I declare that what I claim is:—

1. Apparatus for weighing materials comprising in combination with a device for the delivery of a uniform stream of the material to be weighed, and in combination with two weighing machines of a normal and known type, an endless conveyor belt disposed beneath the outlet of the said device for the delivery of a uniform stream of the material to be weighed, two pulley wheels adapted to be rotated continuously in opposite directions, the said pulley wheels being adjacent the under surface of the idle portion of the said endless conveyor belt, and jockey rollers disposed adjacent the upper surface of the idle portion of the said endless conveyor belt and means actuating said jockey rollers to press the said belt alternately against the one and the other of the said two opposedly rotating pulley wheels, for the purpose of conveying a continuous uniform stream of material alternatingly into the one and the other of the scale pans of the said two weighing machines and of allowing time for the emptying of the one scale pan during the filling of the other, in such a manner that the procedure is enabled to be continuous and without interruption.

2. Apparatus for weighing materials comprising in combination with a device for the delivery of a uniform stream of the material to be weighed, and in combination with two weighing machines of a normal and known type, an endless conveyor belt disposed beneath the outlet of the said device for the delivery of a uniform stream of the material to be weighed, two pulley wheels adapted to be rotated continuously in opposite directions, the said pulley wheels being adjacent the under surface of the idle portion of the said endless conveyor belt, jockey rollers disposed adjacent the upper surface of the idle portion of the said endless conveyor belt and adapted to press the said belt alternately against the one and the other of the said two opposedly rotating pulley wheels, a pendulum lever with a cross head piece to which the said jockey rollers are attached, a pivot disposed at the head end of the said pendulum lever about which the same is adapted to oscillate, a spring attached to the said pendulum lever, and means adapted to alter the position of the said spring periodically from the one side of the said pendulum lever to the other, for the purpose of enabling the said pendulum lever to be transferred oscillatingly from one position into another by the action of the said spring.

3. Apparatus for weighing materials comprising in combination with a device for the delivery of a uniform stream of the material to be weighed, and in combination with two weighing machines of a normal and known type, an endless conveyor belt disposed beneath the outlet of the said device for the delivery of a uniform stream of the material to be weighed, two pulley wheels adapted to be rotated continuously in opposite directions, the said pulley wheels being adjacent the under surface of the idle portion of the said endless conveyor belt, jockey rollers disposed adjacent the upper surface of the idle portion of the said endless conveyor belt and adapted to press the said belt alternately against the one and the other of the said two opposedly rotating pulley wheels, a pendulum lever with a cross head piece to which the said jockey rollers are attached, a pivot disposed at the head end of the said pendulum lever about which the same is adapted to oscillate, a spring attached to the said pendulum lever, means adapted to alter the position of the said spring periodically from the one side of the said pendulum lever to the other, means for retaining the said pendulum lever in one of the two said positions after each alteration of the position of the same independently of the action of the said spring, and means for controlling the said retaining means and adapted to be operated by the movement of the scale beams of the said two weighing machines.

4. Apparatus for weighing materials, comprising an endless travelling belt adapted to discharge at opposite positions, weighing means adjacent each discharge position, and means for alternately moving the belt in opposite directions whereby the material to be weighed is discharged alternately into the several weighing means.

5. Apparatus for weighing materials, comprising a pair of oppositely disposed rolls, an endless belt travelling thereover, weighing means adjacent each roll and adapted to receive material from the belt and means for alternately moving the belt in opposite directions to discharge material therefrom alternately into the several weighing means.

In testimony whereof I affix my signature.

VLADIMIR DMITRIJEVIČ POPOV.